(12) United States Patent
Mickeleit

(10) Patent No.: US 7,903,292 B2
(45) Date of Patent: Mar. 8, 2011

(54) METHOD FOR TRANSMITTING DATA IN NETWORKS OVER DATA LINES

(75) Inventor: Carsten Mickeleit, Berlin (DE)

(73) Assignee: Thinprint GmbH, Berlin (DE)

( * ) Notice: Subject to any disclaimer, the term of this patent is extended or adjusted under 35 U.S.C. 154(b) by 908 days.

(21) Appl. No.: 10/204,516

(22) PCT Filed: Feb. 23, 2001

(86) PCT No.: PCT/DE01/00709
§ 371 (c)(1),
(2), (4) Date: Oct. 28, 2002

(87) PCT Pub. No.: WO01/63828
PCT Pub. Date: Aug. 30, 2001

(65) Prior Publication Data
US 2003/0188008 A1    Oct. 2, 2003

(30) Foreign Application Priority Data
Feb. 23, 2000  (DE) .................................. 100 08 377

(51) Int. Cl.
| G06F 3/12 | (2006.01) |
| G06K 15/00 | (2006.01) |
| H04N 1/41 | (2006.01) |
| H04N 1/42 | (2006.01) |
| H04N 1/00 | (2006.01) |

(52) U.S. Cl. .................. 358/426.08; 358/1.15; 358/400; 358/435; 358/1.13; 358/1.1

(58) Field of Classification Search .................. None
See application file for complete search history.

(56) References Cited

U.S. PATENT DOCUMENTS

| 4,156,798 A | * | 5/1979 | Doelz ............................ 700/4 |
| 4,839,829 A | * | 6/1989 | Freedman ..................... 715/751 |
| 4,955,021 A | * | 9/1990 | Wei .............................. 370/401 |
| 5,101,290 A | * | 3/1992 | Eng et al. ..................... 398/51 |
| 5,278,665 A | * | 1/1994 | Sawada et al. ............... 358/442 |

(Continued)

FOREIGN PATENT DOCUMENTS

EP          858026 A1  *  8/1998

(Continued)

OTHER PUBLICATIONS

Printout of http://web.archive.org/web/20000301150058/www.icq.com/faq/files.html electronic file entitled "ICQ FAQ Why Do I get 'Stuck' if I Send Large Files to a User on My Contact List?", ICQ Inc., May 2, 1999.

(Continued)

*Primary Examiner* — Twyler L Haskins
*Assistant Examiner* — Myles D Robinson
(74) *Attorney, Agent, or Firm* — Norris McLaughlin & Marcus, PA (57) ABSTRACT

Bandwidth of a data line of a network is subdivided into at least two portions before or during transmission so that, while a recipient is receiving data being transmitted to the recipient from a sender over a first portion of the data line, the recipient can transmit data to the sender or another device over free bandwidth on the other portion(s) of the data line.

16 Claims, 8 Drawing Sheets

U.S. PATENT DOCUMENTS

| | | | | |
|---|---|---|---|---|
| 5,396,342 A * | 3/1995 | Meyer | | 358/406 |
| 5,495,485 A * | 2/1996 | Hughes-Hartogs | | 370/524 |
| 5,526,350 A * | 6/1996 | Gittins et al. | | 370/468 |
| 5,541,640 A * | 7/1996 | Larson | | 348/14.15 |
| 5,544,228 A * | 8/1996 | Wagner et al. | | 379/67.1 |
| 5,644,404 A * | 7/1997 | Hashimoto et al. | | 358/402 |
| 6,141,053 A * | 10/2000 | Saukkonen | | 375/240.01 |
| 6,268,926 B1 * | 7/2001 | Okimoto et al. | | 358/1.15 |
| 6,310,883 B1 * | 10/2001 | Mann et al. | | 370/408 |
| 6,337,745 B1 * | 1/2002 | Aiello et al. | | 358/1.15 |
| 6,661,781 B1 * | 12/2003 | Chitre et al. | | 370/330 |
| 6,674,994 B1 * | 1/2004 | Fell et al. | | 455/3.06 |
| 2002/0019786 A1 * | 2/2002 | Gonzalez et al. | | 705/28 |
| 2003/0063304 A1 * | 4/2003 | Satomi et al. | | 358/1.11 |
| 2003/0210429 A1 * | 11/2003 | Yamashita | | 358/1.18 |
| 2003/0235338 A1 * | 12/2003 | Dye | | 382/232 |
| 2005/0057773 A1 * | 3/2005 | Buck et al. | | 358/1.15 |
| 2006/0082807 A1 * | 4/2006 | Tanaka et al. | | 358/1.15 |
| 2006/0164676 A1 * | 7/2006 | Walker et al. | | 358/1.15 |

FOREIGN PATENT DOCUMENTS

| | | | |
|---|---|---|---|
| JP | 03175069 A | * | 7/1991 |
| WO | WO 9706619 A1 | * | 2/1997 |

OTHER PUBLICATIONS

Printout of Printing_Responding_To_A_FileDirect_Request pdf electronic file entitled "Responding to a File Request" ICQ Inc., 1999.

Printout of http://web.archive.org/web/20000815230629/www.icq.com/icqtour/advanced/events.html electronic file entitled "A Guided Tour to ICQ", ICQ Inc., 1999.

Screen shot of "ICQ-Sending files to ICQ User" and "ICQ 99b Help File", ICQ Inc., 1999.

Printout of http://1ftp.yar.ru/NEWS electronic file, Jan. 11, 1999.

Printout of http://web.archive.org/web/20010408034116/1ftp.yar.ru/1ftp-man.html electronic file, Feb. 2, 2001.

Printout of http://www.birdsoft.demon.co.uk/proglib/slowpipe.htm electronic file entitled "Programmer's Reources", Nov. 3, 1996.

* cited by examiner

METHOD FOR TRANSMITTING DATA IN NETWORKS OVER DATA LINES

BACKGROUND OF THE INVENTION

The invention relates to a method for transmitting data in networks over data lines.

Methods for data compression have been known for some time and serve to reduce the volume of data before it is otherwise processed, so that it requires less memory or can be transmitted more quickly over communication lines.

Thus the following examples are known processes applying current techniques:

EP 0 933 B76 describes a method of compressing and transmitting data in unreliably functioning networks. After the first communication between two interacting terminals, Terminal 2 sends a defined algorithm for data compression to Terminal 1. Data is compressed according to this algorithm and returned to Terminal 2, where data is unpacked according to the originally sent algorithm.

U.S. Pat. No. 5,822,524 describes a process for transmitting multimedia data, such as videos, in a network. Multimedia data is called up from a server via a user terminal and sent compressed and digitalized in such a way that the user terminal's buffer, which can normally save 1 to 5 video images, is always full. Video data is thus not linked to a continuous or medial data stream.

U.S. Pat. No. 5,564,001 also describes a method of transmitting multimedia data in networks with limited bandwidth, which includes telecommunication cable networks. Here, multimedia data is separated into important and less important multimedia information according to a psychographics parameter. The data can thereafter be at least partially compressed. After transmission to the user, the compressed data is decompressed and rejoined with the data which was sent in uncompressed form.

EP 0 852 445 discloses a method to optimize bandwidth for compressed multimedia data streams for transmission in networks. Compressed data blocks are marked before being sent so that each block's marker includes the data block's enclosed data volume, information relevant to compression/decompression, and the point at which each data block is to be reinserted into the entire data composite. In addition, before data transmission, a server detects the recipient's minimum buffer capacity and minimum number of receivable data blocks. This information, combined with the transmission rate of the compressed data blocks, allows calculation of an optimal stream of compressed data blocks to the recipient's buffer, and the compressed data blocks can be transmitted with a specific minimum rate to keep the recipient's buffer running just barely above idle. This transmission method guarantees transmission of compressed data blocks over an appropriate bandwidth, because available bandwidth depends on the recipient's buffer capacity. A large receiving buffer increases available bandwidth; a faster transmission of compressed data blocks ensues to prevent the buffer from idling and thus avoid momentary freeze images. In contrast, data block transmission decreases for a small buffer to prevent a superimposition of the individual images.

The known methods of transmitting compressed data reduce data volume for transmission by compressing data to be transmitted; however, they cannot prevent the fact that sender and recipient of this data have no access to data available in the network during data transmission. The recipient is blocked for the duration of data transmission and incapable of communication with other end devices or the central processing unit of each network.

Because data volume intended for transmission nevertheless continually increases in networks (for example, extensive print jobs, high-resolution images, or multimedia data information), this problem cannot be ignored.

SUMMARY OF THE INVENTION

Therefore the object of the present invention is to develop a method with which an unhindered communication is secured for the data sender and/or recipient during transmission of voluminous data in a network.

This object is solved by the features according claim 16.

DETAILED DESCRIPTION OF THE PREFERRED EMBODIMENTS

Figure 2:
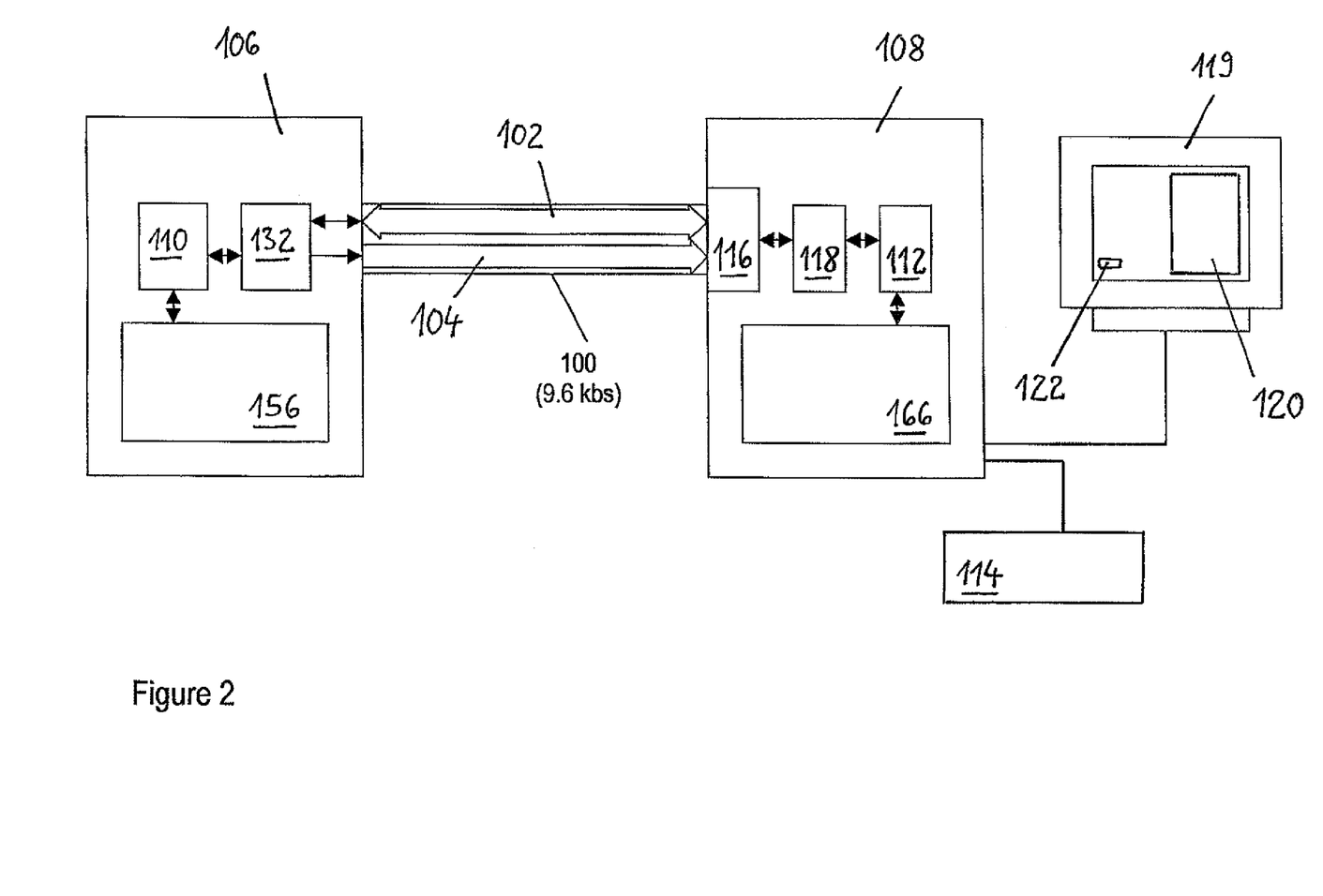
FIG. 2 illustrates an exemplary arrangement of sender and recipient connected by a communication channel subdivided into two subchannels.
Figure 3:
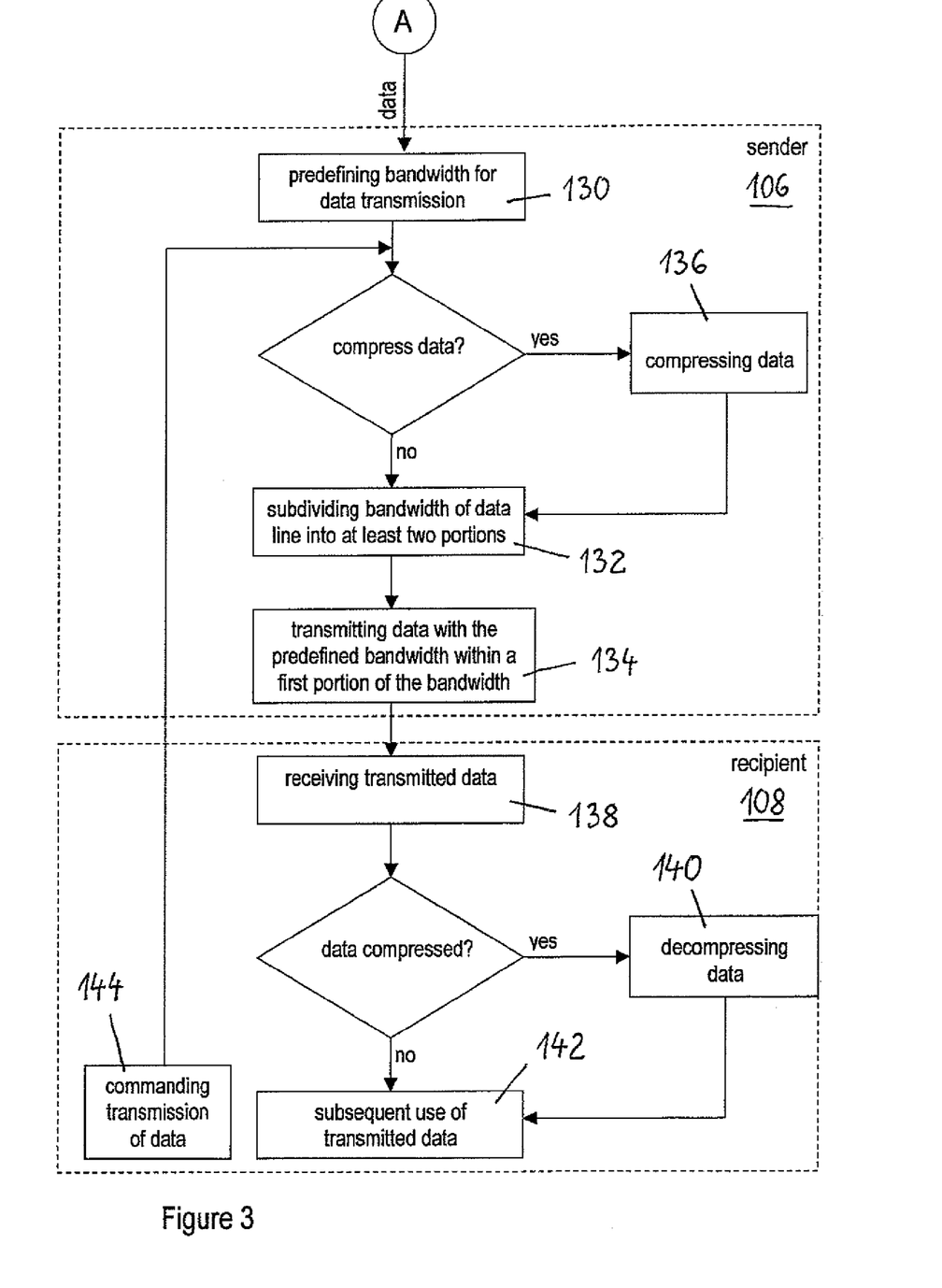
FIG. 3 is a flowchart illustrating steps of subdividing bandwidth and data compression.

Referring to FIGS. 2 and 3, the invention thereby prescribes that bandwidth 102 is predefined 130 or at least divided 132 into two areas before 102, 104 before transmission in consideration of the network's available data line 100 for data transmission to each respective recipient 108, so that data can be transmitted 134 from sender 106 to each respective recipient 108 over a predefined bandwidth 102 parallel to data reception 138. The recipient 108 can likewise send other data over the free bandwidth 104 to the sender 106 or to other net participants while receiving data 138. After receiving data 138 are available for subsequent use 142 on recipient's side.

No predetermination of communication direction is set during the division of bandwidth into areas, so that data can be transmitted in any direction and/or bi-directionally.

Data can also be compressed 136 before transmission to enable processing an even larger amount of data as necessary. For this purpose the sending device 106 is equipped with means for data compression 110. Data compression 136 is effected using known algorithms. The efficiency of compression using algorithms increases with the size of the data being compressed. For example data to be transmitted is compressed 136 before transmission 134 by the sender 106 and subsequently sent 134 over the designated portion 102 of bandwidth 100, and that the transmitted data is decompressed 140 by the recipient 108. For this purpose the receiving device 108 is equipped with means for data decompression 112. In a preferred embodiment of the invention the command to transmit data 144 is given by recipient 108 to sender 106. In another preferred embodiment of the invention the command to transmit data 144 is given from recipient 108 by piloting a virtual port 116.

Figure 4:
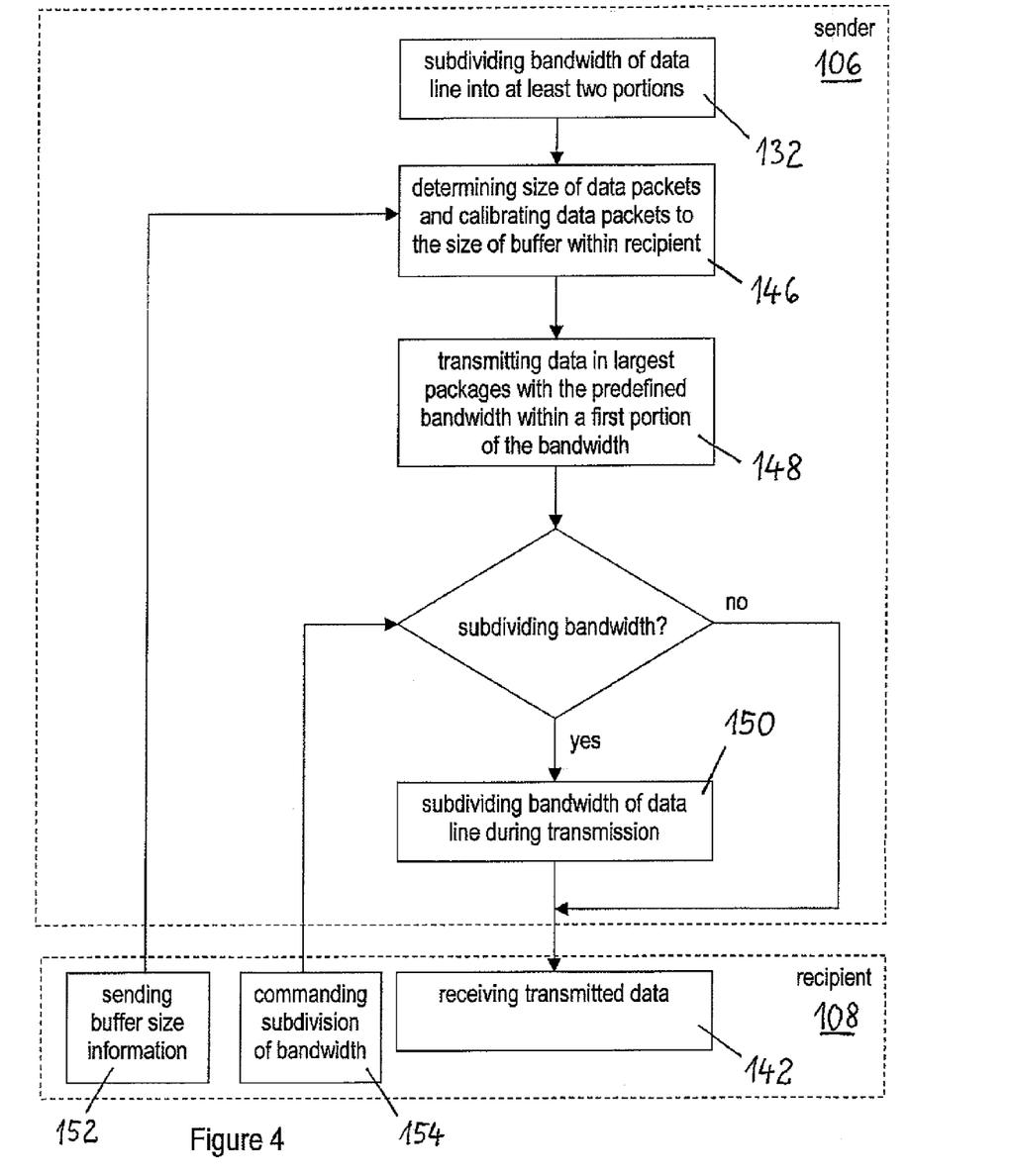
FIG. 4 is a flowchart illustrating steps of calibrating data packets to the size of a buffer within a recipient.

Referring to FIG. 4, multimedia data and print data are usually sent over an appropriate data line in a constant stream of relatively small packets. With the method according this invention, relatively large packets are used, which can furthermore be optimally compressed. In a preferred embodiment compressed data is sent in a stream of data packets with the largest volume possible 148. The speed of transmission is thus additionally improved. This is achieved by sending buffer size information 152 to the sender 106, and calibrating data packets 146 to the size of buffer 118 within recipient 108.

Figure 7:
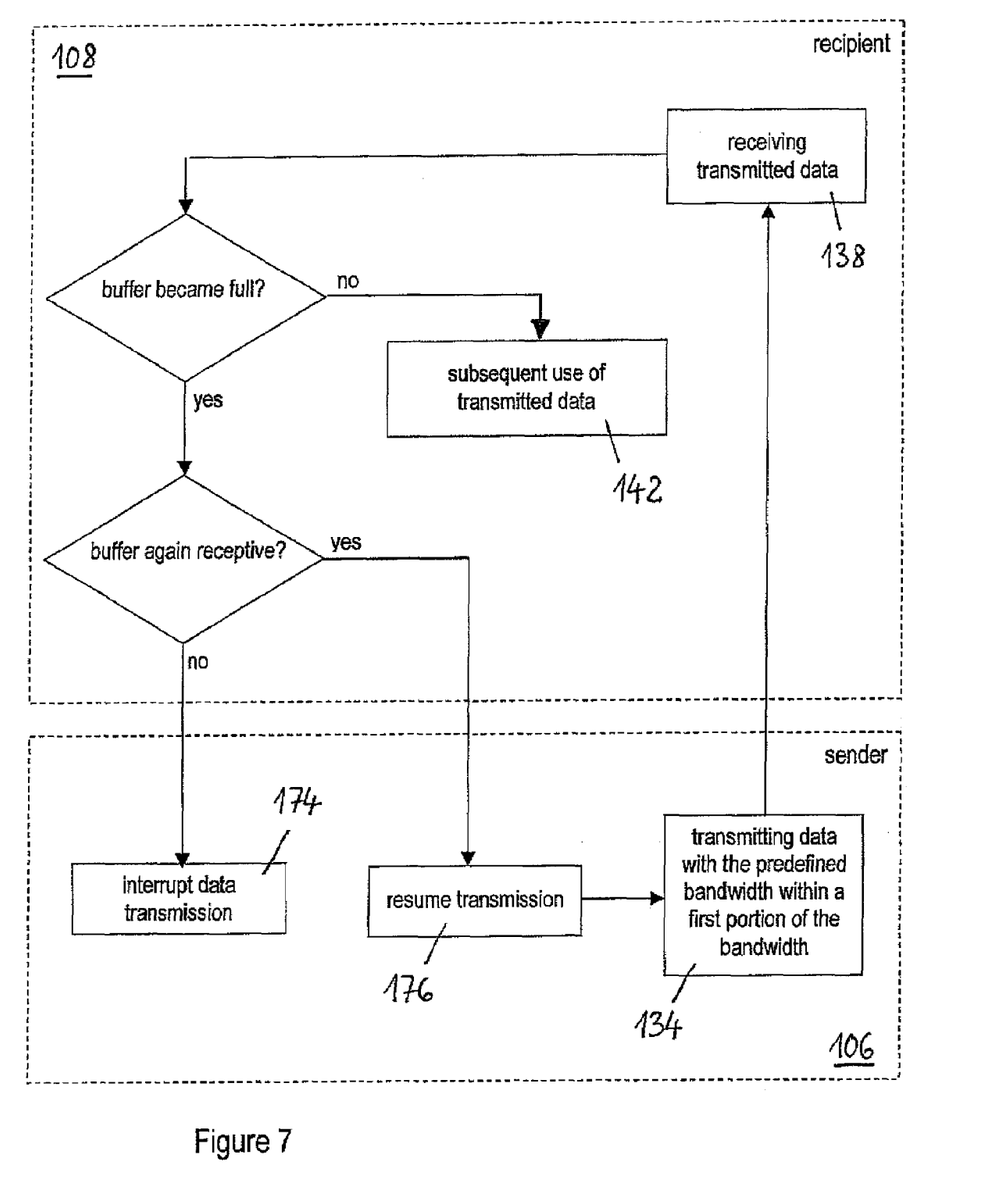
FIG. 7 is a flowchart illustrating steps of controlling data transmission depending on the status of a buffer on a recipient side.

With this method, communication with the end device occurs under use of the end device's buffer 118, whereas data transmission occurs in packets which are calibrated 146 for the end device's buffer 118. Referring to FIG. 7, the transmission process is interrupted 174 if the end device's buffer 118 is full. The process restarts 176 once the buffer 118 is again receptive.

Figure 5:
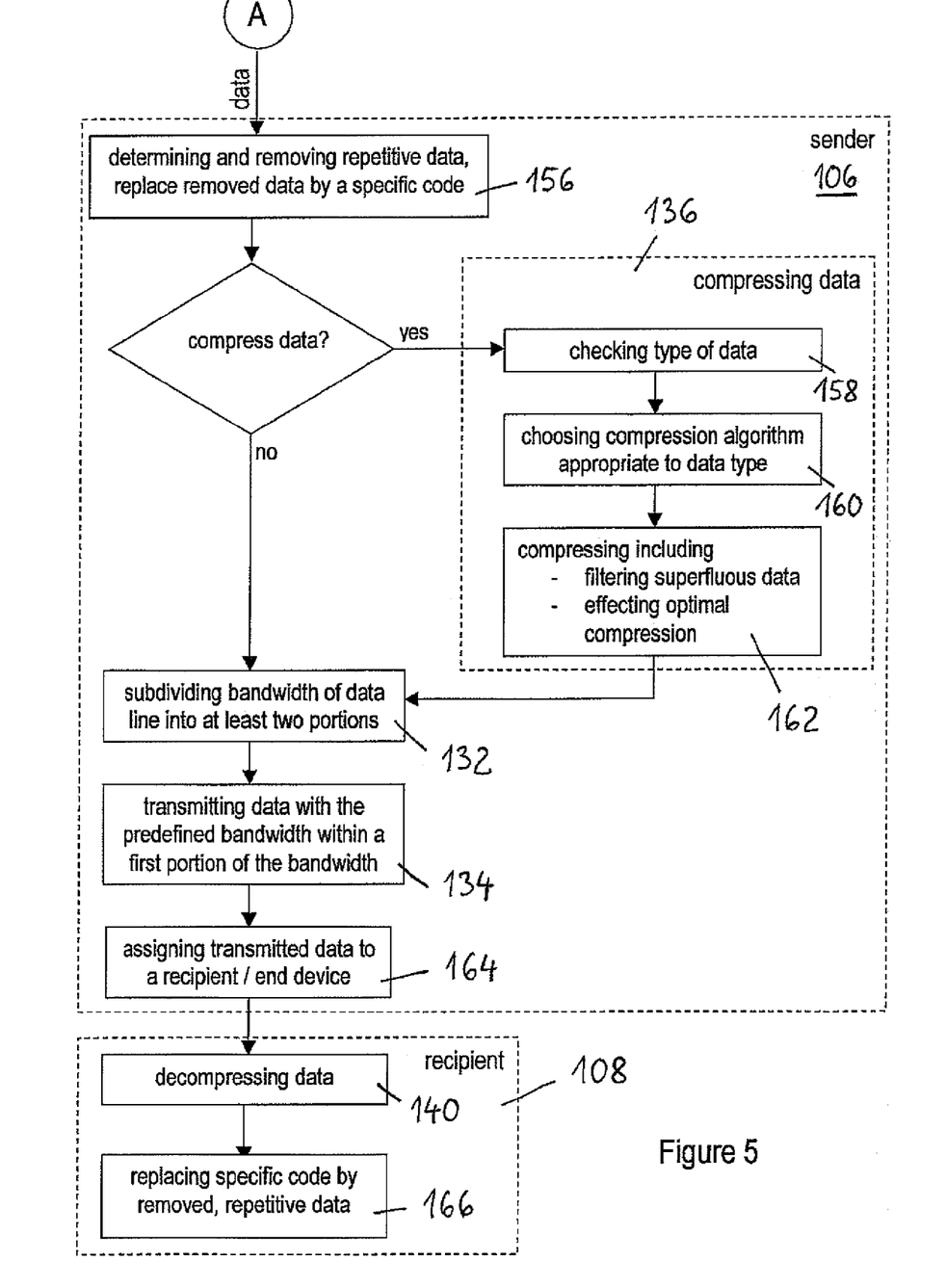
FIG. 5 is a flowchart illustrating adaptation of compression algorithms to data types.

Referring to FIG. 5, one embodiment of the invented method prescribes that, after checking the type of data 158 to be transmitted, the algorithms used for compression are specifically calibrated 160 to the type of data to be compressed. It is thus possible to apply algorithms which are calibrated to the relevant printer language—e.g., PostScript, PCL, or RAW—for data output on a printer which hereby directly or indirectly represents the data recipient.

Algorithms specifically calibrated 160 to the type of data to be compressed also enable superfluous data to be filtered out 162, as when an acceptable loss of quality is tolerated with multimedia data, which further downsizes the amount of data to be compressed.

It is furthermore possible to send redundant data sequences one time only in compressed form to the recipient and to save it there, so that repeated transmission of identical data sequences is unnecessary. This leads to an increased improvement to transmission rate of compressed data. This can occur in such a way that instead of the data sequence, which has already been sent once, a specific code can be sent 156, which has the effect at the recipient that the relevant data sequence is inserted 166.

Any network is suitable for the transmission of compressed data. This includes fixed networks, networks combining fixed and mobile networks, and purely mobile networks. Networks should have a minimum bandwidth of 9.6 kbs for optimal deployment of the inventive method. The inventive method is nonetheless also deployable in networks which do not fulfill this requirement of 9.6 kbs.

The inventive method is preferably found in companies connecting to their branch offices over external networks such as the internet using mobile connections.

Data entry, e.g. accounting, is effected in the branch offices themselves using data input means 114, whereby a host system is accessed. Accounting vouchers are in turn printed in the respective branch office. Because this data is sent from the host system 106 to the branch office 108 over a data line 100, a data line 100 using current technique is occupied for a fairly long time with print data, so that additional account entry is impossible or at least difficult. With the invented method, accounting transactions can henceforth be processed during output of the print data via the predefined bandwidth 102. Print data is transmitted 134 by user command 144 in the branch office 108 through the host system 106, whereby the predefined bandwidth 102 is only preset 130 indirectly over the host system 106 as sender, because the user of the computer in the branch office 108 (i.e., recipient of the print data) enters 144 the command for it. It is usually irrelevant to the user whether he is using his or the host system; the command "Print" is simply given for a print job, whereas depending on where the data is stored, either the local computer or the host system forwards the data to the appropriate printer. With the invented method, print out ensues over a virtual printer port 116 which the user can specifically control.

Recipient 108 and sender 106 here are usually the computer in the branch office and the host system respectively, whereby other appropriate data processing devices could also be used as recipient and sender.

Predefinition of the bandwidth allocated for transmission 130 of the compressed data can be set manually or automatically, once or continually, and absolutely or in relation to the total available bandwidth or in relation to the bandwidth necessary for transmitting the compressed data. Manual predefinition ensues from the host system or from the end device. In a preferred embodiment bandwidth 102 is defined continuously or adjusted 154 during transmission causing subdivision of the bandwidth of data line during transmission 150.

As a rule a bandwidth 100 of 64 kbs is available for connection between branch offices or subsidiaries and a host system. It is thus possible, for example, to manually preset 130 bandwidth 102 for transmitting compressed data from the central processing unit 106 to an end device 108 to 32 kbs, so that a bandwidth 104 of 32 kbs are still available for the data stream from the end device 106 (as sender) to the central processing unit 108 (as recipient).

If the network's maximum bandwidth 100 is unknown, available bandwidth 102 can be preset 130 manually in relation to the maximum bandwidth 100; for example 50% of maximum bandwidth 100 can be reserved for transmitting compressed data.

If the data stream from the central processing unit 106 to the end device 108 greatly overbalances the incoming data stream from end device to central processing unit, bandwidth can be set in relation to the amount of data to be transmitted. For example, 75% of maximum bandwidth 100 for the data stream from central processing unit to end device and only 25% for the data stream from end device to central processing unit.

Because manual predefinition requires knowledge of the maximum bandwidth 100 or the amount of data to be transmitted, it is advantageous to define 130 these settings software-controlled and therefore automatically.

Another optimization of the invented method is that the bandwidth setting 130 is not conducted once but is checked by software at specific intervals or for every transmission of larger amounts of data and set accordingly.

After compressed data is transmitted 134 from sender 106 to recipient 108, it is there decompressed 140 with the algorithm used for compression, if the data is not to be saved in compressed form.

If data is to be printed directly from a printer without being temporarily stored on a computer, the printer itself, which usually has sufficient memory available, can decompress the data 140; or an external print server can undertake decompression 140 and then forward the data to the printer.

Today it is usual for a user to preview 120 a document on the monitor 119 of a computer before beginning a protracted printout of texts, graphics, etc. In the framework of a network architecture, in which the application is run on a remote server, this is not sensible because transmitting the page image is almost as time-consuming as sending the final printout to the printer. The user must then have two waiting periods. According to the invented method, a provision is therefore made that the page preview 120 is sent as data stream to the end user 108 and displayed there, whereby the data in this data stream can additionally be used for printing the relevant page, making a second transmission unnecessary.

Preferred data for transmission is multimedia or print data. The invented process is especially suitable for the transmission 134 of enormous amounts of data. Computer games and above all network computer games which can be run with any number of participants, music, videos, books, files, or 3-D illustrations represent enormous amounts of data whose transmission 134 can be managed using the invented method.

The invented method enables transmission 134 of amounts of data of any size with appropriate compression of data volume and predefinition 130 of a bandwidth 102 for the transmission 134, so that parallel network access during data transmission 134 via the free bandwidth 104 can proceed unhindered.

Unhindered communication via the free bandwidth 104 with other end devices during data transmission 134 is thus possible. The recipient 108 can enter data into the net via the free bandwidth 104 while he is receiving 138 a transmission 134 of compressed data via The predefined bandwidth 102.

Amounts of data of any size can be called up from the internet via the predefined bandwidth 102, for example, and magnetically or digitally saved on each end device while "surfing" the internet can proceed unimpaired via the free bandwidth 104.

Figure 6:
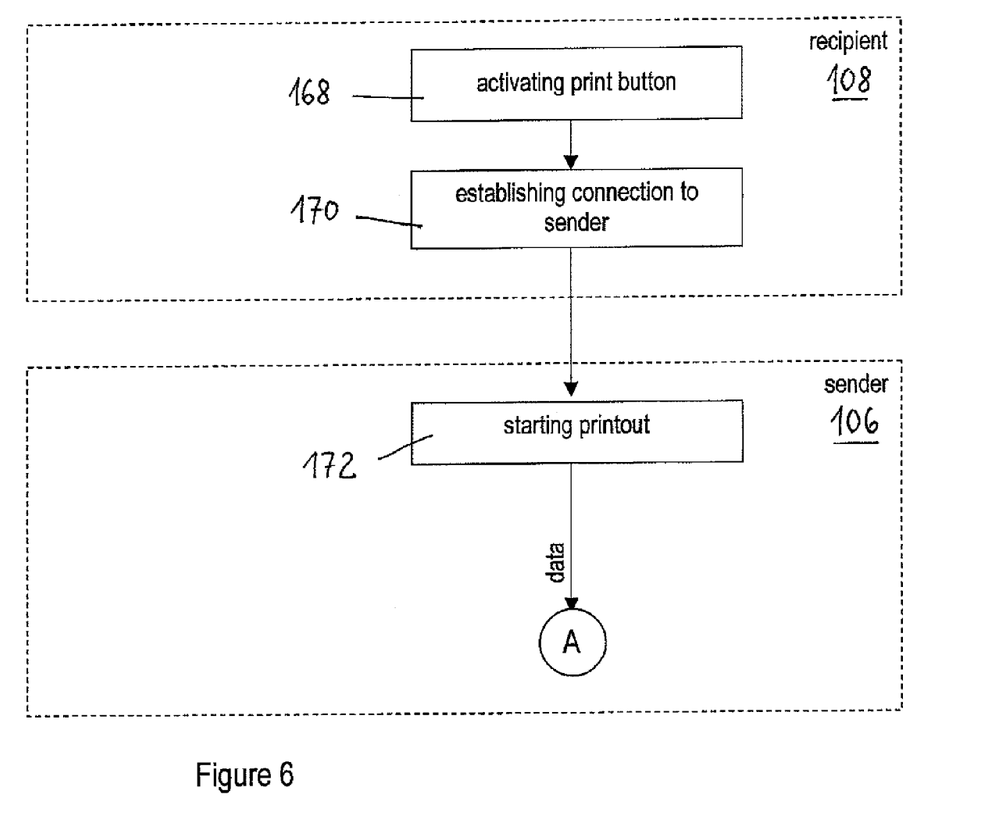
FIG. 6 is a flowchart illustrating steps of simultaneously establishing a connection to an internet server and starting a print job on the internet server by activating a print button.

When data is requested from an internet server, the connection can on one hand be established both after receipt and before the next request. On the other hand, it is possible for the user to target the internet server without giving his own address (IP masking), which is very interesting for security reasons and therefore often practiced. The internet server is then informed that the user is collecting information. For printing, the internet server must complete pre-processing and then send the data stream to the end device, which it usually cannot address. Either the user keeps a constant connection open to the internet server, which leads to higher communication costs and bandwidth usage, or the user must constantly check if a print job exists, which can be lead to corresponding disadvantages. Referring to FIG. 6, the method therefore advantageously provides a print button 122 for internet applications, which by activating 168 the print button 122, automatically, simultaneously starts 172 the print job on the internet server and prompts the end device to establish a connection 170 to the internet server.

The invented method also offers the option of processing print data within the context of so-called web printing Here, print data is sent from the end device to a URL, which this method expands to two further components to stipulate the form of the print job and the target address. Thus it can be stipulated whether the print job is sent as fax, SMS, e-mail, etc., and to which telephone number it should be sent. In this case it is possible for the computer found under the URL to send data and receive the print data and to forward it as instructed.

Figure 8:
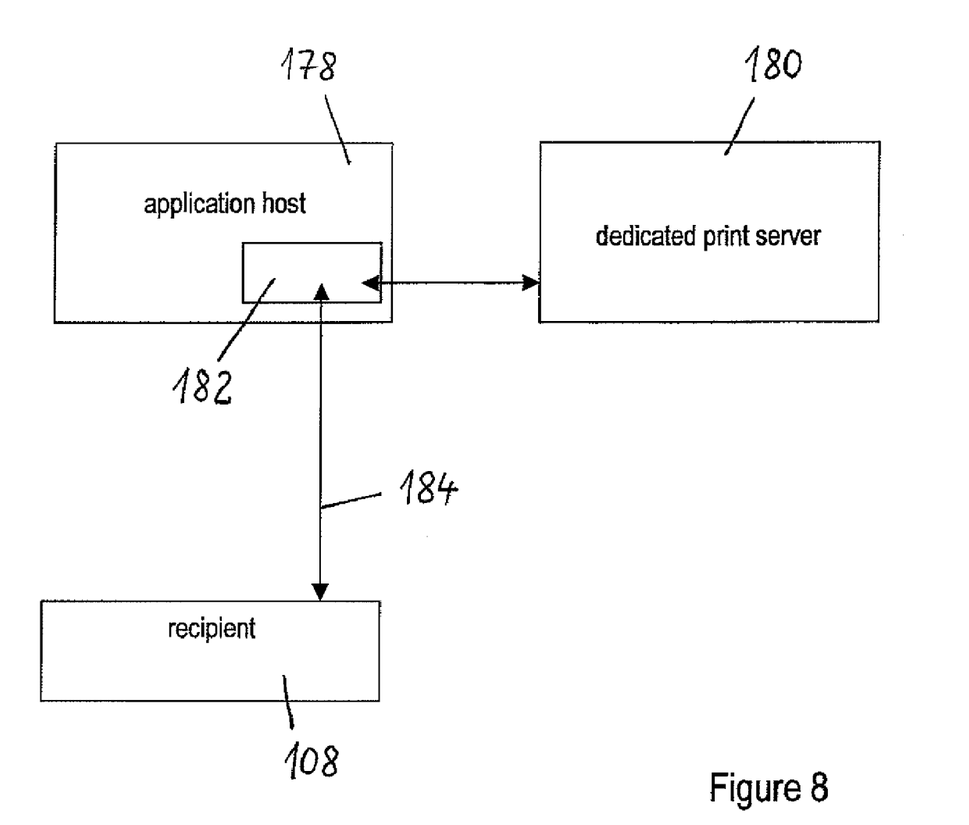
FIG. 8 shows the use of a gateway for communication between a user of both an application server and a dedicated print server.

Likewise, referring to FIG. 8, the invented method can be used as a communications gateway 182 for dedicated print servers 180. Print jobs in networks are in general swapped out to print servers 180 for pre-processing for reasons of simplified administration. The end device 108 must therefore have a connection to both the application host system 178 as well as the dedicated print server 180. It is, however, more sensible to establish a single, secure connection to the internet for security reasons. The method therefore provides that a gateway 182 can be installed on the application host system 178 which reroutes communication to the dedicated print server 180 so that it appears to the use as if the print stream were coming directly from the application host system 178. Thus the end user 108 only needs to establish a single connection 184 to the host system 178.

With one embodiment of the invented method, transmitted data is assigned 164 to a user/end device in such a way that data consumption concerning the number of printed pages, bandwidth reservation, bandwidth usage, data volume, and saved data volume can be registered and used for billing purposes and for limitation of printouts according to the status of each user account.

Additional advantageous embodiments are characterized in the sub-claims.

Hereinafter the inventive method will be exemplified with a diagram.

Figure 1:
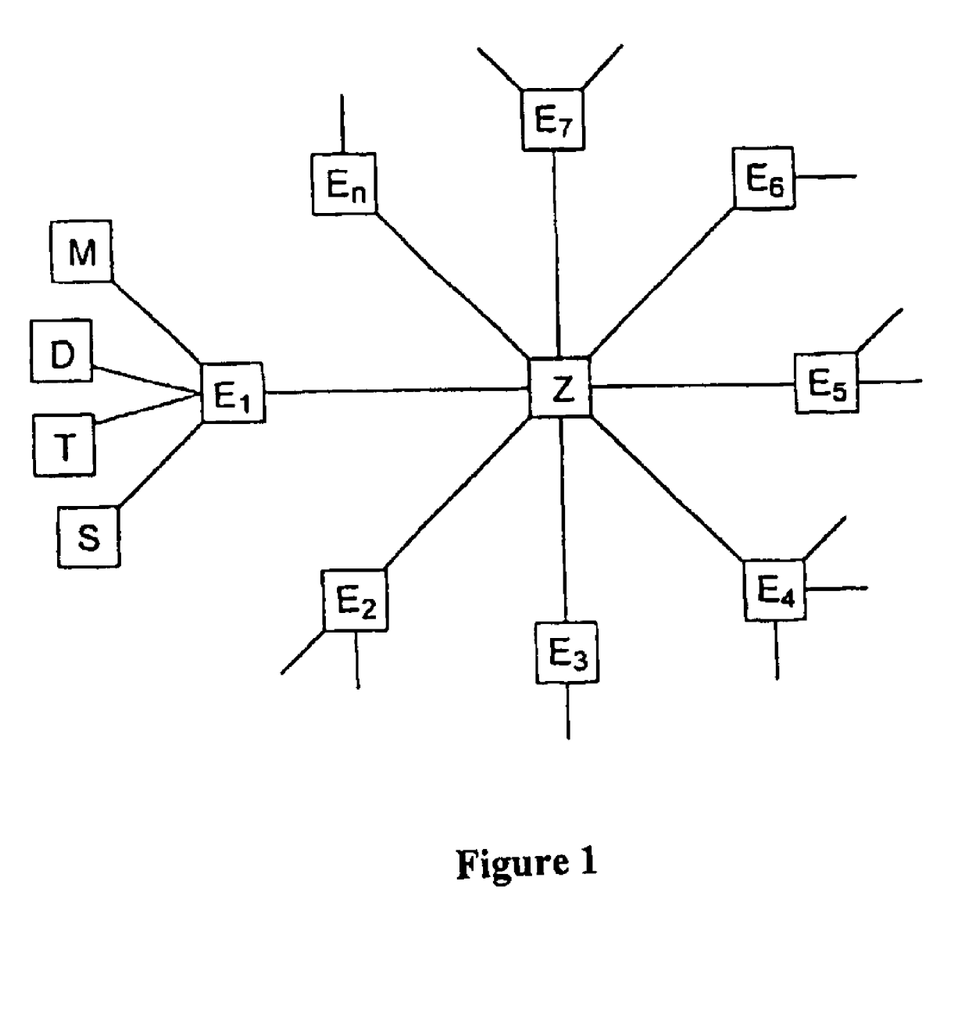
FIG. 1 is a diagram depicting a network including a central processing unit Z and any number of end devices from $E_1$ to $E_n$.

FIG. 1 depicts a network consisting of a central processing unit Z and any number of end devices from E1 to En. The end devices E1 to En are connected with additional output or storage devices and an input unit, which are only represented for end device E1. E1 is connected with a storage unit S, an input unit T, a printer D, and a monitor M. The individual lines represent the data lines between end devices and the central processing unit.

CPU Z, on which as example a data base with music recordings is saved, is controlled across the network from E1. The user on E1 selects and retrieves several musical pieces. Now the multimedia data is compressed 162 on CPU Z, 106 using an algorithm specifically calibrated 160 to this type of data and bandwidth 102 is set 130 according to the amount of data to be transmitted. Now the compressed data is transmitted 134 without influencing the user on E1 108. He can continue to be active in the network without problem and himself enter data into it, because the data stream from E1 to Z is undisturbed by the incoming data stream. The data sent to E1 is to be burned onto CD there. To do so, the data is decompressed 140 on E1 108 and forwarded to the storage unit S, which in the illustrated example is a CD burner.

Another practice could be as follows: Z 106 is a server in an in-house network of a decentralized company on which entire customer files, all produced wares, delivery amounts, delivery times, prices, etc., are saved. E1 108 is a computer in a branch office. From there, all information about a certain product can now be called up; it's sent in compressed form from server Z 106 to end device E1 108 while the incoming data stream continues to be sustained. For example, orders can be sent from E1 abroad to Z for central processing during transmission 134 of compressed data from Z 106 to E1 108. The transmission 134 of compressed data is forwarded from E1 108 directly to a printer which, using software that has been specifically adjusted to the applied printer language, decompresses 140 and prints the received print data. Moreover, the transmitted data can be forwarded from E1 to a storage unit S, where it is saved in compressed form until the next update.

Then invention claimed is:

1. A method for transmitting data over a data line of a network comprising:

providing a user end device coupled to the data line via an interface, wherein a bandwidth for data transmission over the data line is available at the interface, and the data line connecting the user device and a remote server;

a user at the user end device starting a print process on the remote server;

before or during transmission of first data generated by the print process on the data line of the network, the user at the user end device coupled to the data line entering a command for adjusting a data rate for transmitting the first data generated by the print process from the remote server to the user end device in order to subdivide the bandwidth of the data line at the interface into at least two bandwidth portions, wherein the user controls the data transmission on the data line, and wherein a first predefined bandwidth portion of the at least two bandwidth portions of the data line is allocated to the first data generated by the print process to be transmitted in a first data transmission from the remote server to the user end device, and further wherein at least one second bandwidth portion other than the first predefined bandwidth portion of the data line is adapted for transmission of second data in a second data transmission independent from the first data transmission, wherein the at least one second bandwidth portion is usable for bidirectional data transmission.

2. The method of claim 1 further comprising:
compressing at least the first data to be transmitted over the data line before transmission by a sender;
transmitting the compressed data to the user over one of the at least two portions; and
decompressing the transmitted data at the user end device.

3. The method of claim 2, wherein the compressing includes executing an algorithm corresponding to each type of at least the first data to be transmitted and which at least one of filters out superfluous data and effects optimal compression.

4. The method of claim 3 further comprising:
transmitting to the user end device repetitive data sequences in at least the data to be compressed only once in compressed form; and
saving the transmitted, compressed data sequences at the user end device.

5. The method of claim 2 further comprising:
transmitting to the user end device, having a buffer, data packets calibrated to the size of the buffer;
interrupting the transmission of the data packets to the user end device if the buffer becomes full; and
following the interruption of the transmission, resuming the transmission of the data packets to the user end device once the buffer becomes receptive.

6. The method of claim 1, wherein the user provides to a sender a command to transmit the first data.

7. The method of claim 6, wherein the user provides the command to transmit the first data by piloting a virtual port.

8. The method of claim 1, wherein the bandwidths for the respective at least two bandwidth portions are predefined at least one of before the first or second data is transmitted and before each new data transmission.

9. The method of claim 1 further comprising:
continuously defining or adjusting the bandwidths of the respective at least two bandwidth portions during transmission of the first or second data over the data line.

10. The method of claim 9, wherein the data line has a minimum bandwidth of 9.6 kbs.

11. The method of claim 2, wherein the compressed data is sent in a stream of data packets with the largest volume possible.

12. The method of claim 1 further comprising:
assigning transmitted data to the user end device such that data consumption concerning number of printed pages, bandwidth reservation, bandwidth usage, data volume and saved data volume is registerable and usable for billing purposes and for limiting printouts according to status of a user account.

13. The method of claim 1 further comprising:
when a sender is an application host of a dedicated print server, rerouting to the dedicated print server a printing communication transmitted to the sender by the user.

14. The method of claim 1 further comprising:
transmitting a page preview to the user end device as a print stream comprising the first data and displaying the page preview at the user end device; and
using the first data of the print stream for print out.

15. The method of claim 1 further comprising:
providing a print button to the user; and
following activation of the print button by the user, automatically starting print out of print data located at the user end device and simultaneously establishing a connection between the user end device and a sender.

16. The method of claim 1 wherein the transmission of the first data transmission and the second data transmission is in parallel.

* * * * *

UNITED STATES PATENT AND TRADEMARK OFFICE
CERTIFICATE OF CORRECTION

| | | |
|---|---|---|
| PATENT NO. | : 7,903,292 B2 | Page 1 of 1 |
| APPLICATION NO. | : 10/204516 | |
| DATED | : March 8, 2011 | |
| INVENTOR(S) | : Carsten Mickeleit | |

It is certified that error appears in the above-identified patent and that said Letters Patent is hereby corrected as shown below:

Title page, item [73] Assignee: should read --THINPRINT AG --

Signed and Sealed this
Twenty-seventh Day of September, 2011

David J. Kappos
*Director of the United States Patent and Trademark Office*